United States Patent [19]

Saxl

[11] 3,739,633

[45] June 19, 1973

[54] APPARATUS FOR MEASURING TENSION IN WEB-TYPE MATERIALS

[76] Inventor: Erwin J. Saxl, P.O. Box 185, Harvard, Mass. 01451

[22] Filed: Sept. 15, 1971

[21] Appl. No.: 180,660

[52] U.S. Cl. .................................................. 73/144
[51] Int. Cl. ............................................... G01l 5/04
[58] Field of Search ...................................... 73/144

[56] References Cited

UNITED STATES PATENTS

| 2,661,623 | 12/1953 | Brink | 73/144 |
| 3,512,406 | 5/1970 | Roberts | 73/144 |

FOREIGN PATENTS OR APPLICATIONS

| 1,058,018 | 2/1967 | Great Britain | 73/144 |

OTHER PUBLICATIONS

"Measurement & Recording of Tension of Film & Tape," E.U.Saxl, Reprinted from Photographic Science & Engineering, Vol. 9, No. 1, pp. 36–39 Feb. 1965.

Primary Examiner—Charles A. Ruehl
Attorney—Walter J. Kreske

[57] ABSTRACT

Device for measuring tension in web-type materials such as tape, cloth, paper, felt, plastic film and the like which are under tension load, the device including three substantially parallel elongated rods carrying rotatively mounted sleeves for engaging the surfaces of the web-type material, the center rod being a load feeler member extending from the deflection portion of a load deflection beam which incorporates means for measuring the beam deflection in terms of tension in the web-type material, the other two rods being reference members on respective sides of the feeler member and rigidly fixed to a reference plate which is adjustable in perpendicular relation to the plane of the web-type material to compensate for thickness of the web-type material whose tension is being measured. The rotatively mounted sleeves are tapered at the ends farthest from the load deflection beam to facilitate edgewise insertion onto the surfaces of the material for making the tension measurement. Edgewise insertion may also be facilitated by separation of the reference sleeves with respect to the feeler sleeve in perpendicular relation to the web-type material by adjustment of the reference plate.

17 Claims, 7 Drawing Figures

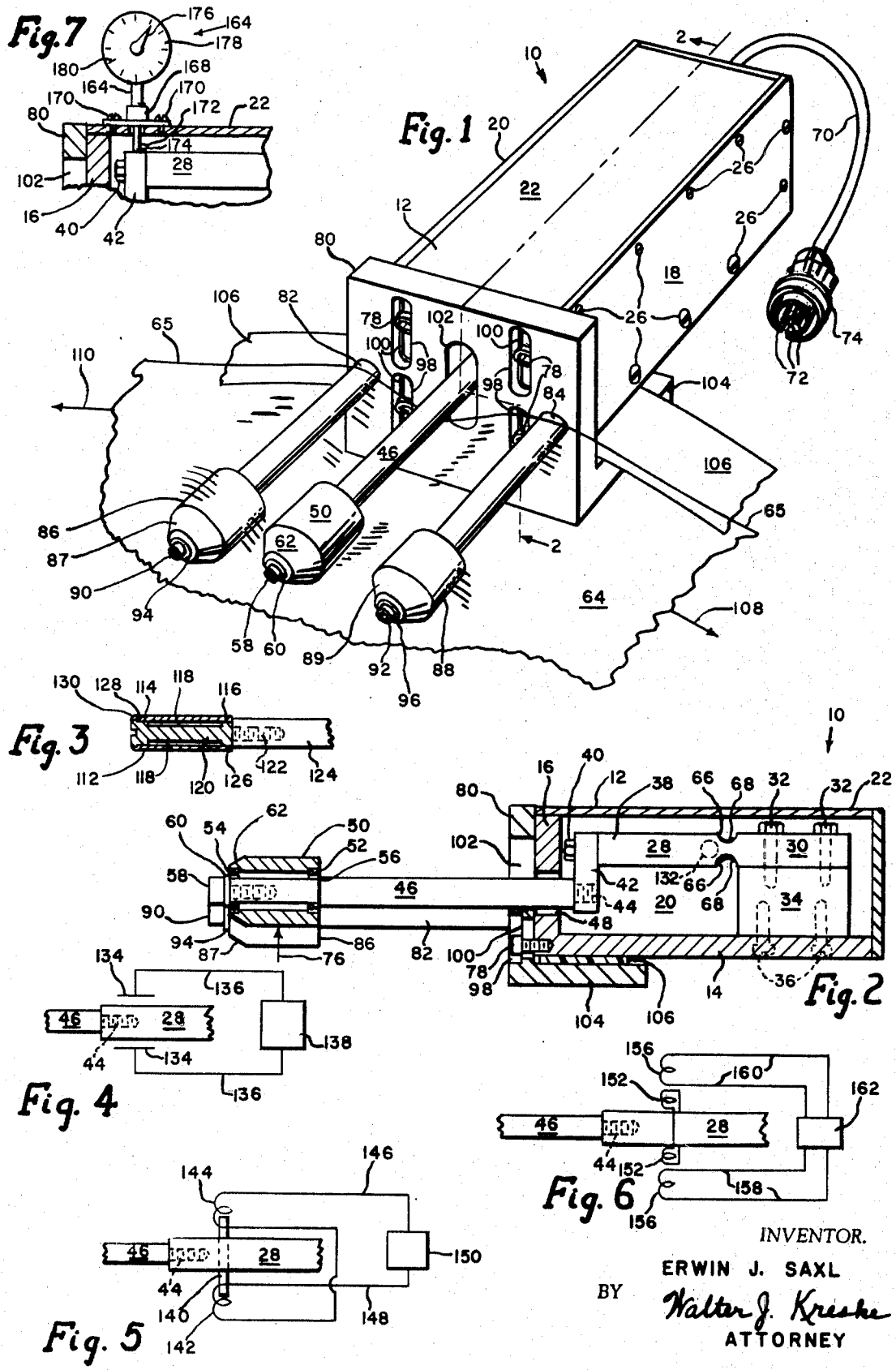

APPARATUS FOR MEASURING TENSION IN WEB-TYPE MATERIALS

BACKGROUND OF THE INVENTION

This invention relates to apparatus for the measurement of tension in web-type materials and more particularly to such tension measuring apparatus which may be inserted into tension measuring position from an edge of the material and tension measurements made without injurious effect to the material or to most coatings which may exist thereon. The apparatus in preferred form includes a load cell in combination with three elongated and substantially parallel members carrying rotatively mounted sleeves for engaging the surfaces of the web-type material and transmitting to the load cell for measurement a load which is characteristic of the tension in the web-type material. By web-type material as herein used is meant such material as tape, cloth, paper, felt, plastic film and the like.

Most conventional load cells in use are for measurement of static load forces applied to the load cell through special adapters such as disclosed in my Multipurpose Load Cell U.S. Pat. No. 3,427,875, or for the measurement of light tension loads in delicate filaments running over pulleys attached to the load cell as disclosed in my Precision Load Cell U.S. Pat. No. 3,610,036, or by a clip-on arrangement of a three pulley system wherein two of the pulleys are fulcrumed to pivot away from the third pulley to permit clipping onto a moving filament for making the tension measurement as disclosed in my U.S. Pat. No. 2,591,724. Also, a load cell with a three pronged feeler arrangement in sliding engagement with magnetic recording and playback tape has been used to measure the small tension force allowable in such tape during recording and playback operation.

While these load measuring devices do perform their measuring functions in the limited areas described, they do not have the capacity to provide meaningful measurements of tension in web-type materials which have a substantial width such as cloth, paper, felt, plastic film and the like. I have found that to achieve repetitive and meaningful measurements of tension in such wide materials the measurements of tension in the material must be made a substantial distance from the selvedge. Also, I have found that the sliding friction of the magnetic recording and playback tape over the three feeler prongs mentioned above tends to create erroneous tension measurements to the extent of variation and unpredictability of the friction force contribution to the tension reading of the load cell. The more highly polished the feeler prongs are, the greater is the tendency of the magnetic tape to cling to the prong surfaces and thereby increase friction. However, while a satin finish on the feeler prongs tends to decrease the friction force, the relatively greater roughness of the prong surfaces contacting the magnetic tape tends to impair the magnetic coating and thereby the fidelity of recording and playback qualities of the tape.

The present invention constitutes a significant advance in the art since applicant's device for measuring tension in web-type material has not only the capacity for making tension load measurements a substantial distance from the selvedge of the material to insure meaningful measurements, but also lends itself to measurements over a very wide range of tension loads. The invention lends itself to efficient measurement of tension loads over a range which includes very small loads, in the order of a few grams encountered in magnetic recording and playback tapes, to heavy duty loads of over 50 thousand pounds encountered, for example, in belting for such applications as aircraft launching catapults.

Another advantage of the present invention is that it inherently minimizes friction forces to negligibly small values of a substantially constant nature by the use of rotationally mounted sleeves for engaging the surfaces of the web-type material. This structural arrangement prevents the undesirable sliding at the contact surfaces with the web-type material and thereby insures against scuffing injuries to the material surfaces or coatings thereon and is particularly important to the preservation of the record and playback fidelity of magnetic tape.

Another important advantage of the invention is that it may be inserted laterally from an edge of the web-type material into tension measuring position a substantial distance from the selvedge regardless of whether the material is in motion or is stationary. This edgewise insertion capability to a meaningful tension measuring distance is not known to exist in any of the prior art tension measuring devices. The previously mentioned filament tension measuring device requires a pulley retracting operation for positioning on a filament and is not applicable to web-type materials, and the above mentioned sliding contact device for record and playback tape is limited to very small forces and incapable of measurements beyond the selvedge of a wide material. By contrast, applicant's present invention may be conveniently inserted laterally to a meaningful tension measuring position and thereafter, when desired, laterally withdrawn in the opposite direction.

And a further important advantage of the present invention is its ready adaptability, by relatively simple mechanical adjustment, for tension measurement in web-type materials of different thicknesses. This feature achieves the novel arrangement wherein a piece of the material itself is utilized as a gage for arriving at an approximation of the mechanical adjustment needed to adapt the invention for making tension measurements in that material and often is the only adjustment needed.

Accordingly, it is an object of the present invention to provide an apparatus for measuring tension in a web-type material which is readily insertable from an edge of the material into tension measuring position a substantial distance from said edge.

Another object is the provision of a web-type material tension measuring apparatus which may be laterally, from an edge of the material, inserted into tension measuring position on the material or removed therefrom while the material is in motion while under tension or is stationary while under tension.

And another object is the provision of a web-type material tension measuring apparatus which does not injure the surface thereof or most coatings thereon during the tensile measuring operation.

A further object is the provision of an apparatus which lends itself to heavy duty as well as very small web-type material tension measurement applications.

A still further object is the provision of a web-type material tension measuring apparatus which is relatively easily adjustable mechanically to adapt to different web-type material thicknesses.

And another object is the provision of a web-type material tension measuring apparatus which is particularly applicable to the measurement of tension in the warp of fabrics both during the weaving operation and thereafter.

And a further object is the provision of a web-type material tension measuring apparatus which achieves a negligibly low friction load at the tension measuring contact with the material.

SUMMARY OF THE INVENTION

An apparatus for measuring tension in a web-type material, constructed in accordance with one aspect of the invention includes a load deflection beam with means in responsive relation to the beam deflection for sensing the magnitude of the load force causing the deflection, an elongated feeler member extending from the deflecting end of the load deflection beam for transmitting the load force to the load deflection beam, the elongated feeler member having a load feeler sleeve mounted for rotation on the elongated feeler member for engaging the web-type material whose tension is to be measured, a pair of elongated reference members straddling the feeler member and carrying a pair of rotatively mounted reference sleeves in operative relation to the feeler sleeve, means fixing the two elongated reference members in place for maintaining the reference sleeves in operative relation to the feeler sleeve, and each of the sleeves having a reduced diameter end for facilitating edgewise insertion of the tension measuring apparatus into operating position on a web-type material whose tension is to be measured. The reference member fixing means is made adjustable perpendicularly to the elongated feeler member to provide adaptability to tension measurement in materials of different thicknesses as well as to facilitate edgewise insertion onto the material. One end of the deflection beam is mounted on a base plate and the fixing means is on the base plate at the other end of the deflection beam, with the adjustable portion having a projection overlapping the base plate to provide a gaging structure for utilizing the web-type material itself in making the material thickness adjustment. The means responsive to beam deflection for sensing the magnitude of the load force causing the beam deflection is achieved by any one of several structures including stress concentration notches carrying strain gages sensitive to beam deflection, capacitor arranged to have voltage sensitive to beam deflection, linear differential transformer arranged on the beam to effect voltage sensitive to beam deflection, high frequency coils arranged on the beam to effect frequency sensitive to beam deflection, electro-optical, mechanical or hydraulic dial indicator, or any other suitable means for deriving a practical readout of load causing the beam deflection.

DESCRIPTION OF THE DRAWINGS

The features of the invention which are believed to be novel are set forth with particularity in the appended claims. The invention, together with the features, objects and advantages thereof will be better understood from the following description in conjunction with the accompanying drawings in which like reference numbers identify like elements, and in which:

FIG. 1 is a perspective view of a web-type material tension measuring apparatus embodying the invention;

FIG. 2 is a cross sectional view taken on line 2—2 of FIG. 1;

FIG. 3 is a cross sectional view showing an alternative rotating sleeve construction applicable to the FIG. 1 embodiment;

FIG. 4 is a view of a portion of a load deflection beam and elongated load sensing member extending therefrom, together with a schematic and block diagram illustration of a capacitive load deflection sensing arrangement suitable for use as an alternative arrangement in the FIG. 1 embodiment;

FIG. 5 is a view of a portion of a load deflection beam and elongated load feeler member extending therefrom, together with a schematic and block diagram illustration of a linear differential transformer load deflection sensing arrangement suitable for use as an alternative arrangement in the FIG. 1 embodiment;

FIG. 6 is a view of a part of a load deflection beam and elongated load feeler member extending therefrom, together with a schematic and block diagram illustration of a high frequency load deflection sensing arrangement suitable for use as an alternative arrangement in the FIG. 1 embodiment;

FIG. 7 is a view of a portion of the FIG. 1 load deflection beam and housing together with a dial indicator load deflection sensing arrangement suitable for use as an alternative arrangement in the FIG. 1 embodiment.

DESCRIPTION OF THE ILLUSTRATED EMBODIMENTS

A web-type material tension measuring apparatus embodying the present invention is designated generally in FIGS. 1 and 2 by the numeral 10. The tension measuring apparatus 10 has a housing 12 comprised of a thick base plate 14 and front end 16 which in the present instance are shown in FIG. 2 as being of a single angle iron construction for rigidity and strength where heavy duty use conditions are to be encountered, as will be hereinafter further described. However, under many use conditions the base plate 14 and front end 16 of the housing 10 may be two separate members fastened together as by welding, screws or the like. The housing 10 also includes two sides 18 and 20, a cover or top plate 22 and a back end plate 24 fastened together by screws 26.

Inside of the housing 12 is a load deflection beam 28 having one end 30 rigidly fixed to a support block 34 by screws 32. The support block 34 is fixed to the base plate 14 by screws 36. The other end 38 of the load deflection beam 28 extends from the support block 34 as a deflectable cantilever, and has fastened thereto at its free end by screw 40 one end of an offset member 42. To the other end of the offset member 42 is screwed the threaded shank 44 of an elongated load feeler member or rod 46 projecting through a clearance opening 48 in the front end 16 of the housing 12. The other end of the elongated load feeler member 46 has a load feeler sleeve 50 rotatively mounted thereon by ball bearing sets 52 and 54 and held in place against a shoulder 56 by a washer 60 and screw 58.

The end of the rotatively mounted load feeler sleeve 50 adjacent the screw 58 has a taper or conical circumference 62 to facilitate insertion, edgewise of a material, into tension measuring position shown with respect to the web-type material 64 in FIG. 1 with the material edge indicated by the numeral 65.

The load deflection beam 28 also has upper and lower stress concentration notches 66 carrying strain gages 68 adjacent the support block 34 and wired in conventional manner (not shown) through a multiwire cable 70 to respective plugs 72 in a plug body 74 for making ready connection to conventional electrical supply and indicating equipment (not shown) for reading out the load deflection information from the strain gages 68 resulting from a load such as represented by the arrow 76 directed at the load feeler sleeve 50 in perpendicular relation to the elongated feeler member 46 which is parallel to the load deflection beam 28.

The tension measuring apparatus 10 also has mounted on the front end 16 thereof by screws 78, a reference member support platee 80. The support plate 80 has mounted thereto a pair of elongated reference members or rods 82 and 84 substantially parallel to and on respective sides of or straddling the elongated load feeler member 46. Such mounting may be by threaded ends on the reference members 82 and 84 similar to threaded end 44 of the feeler member 46. The other end of each of the elongated reference members 82 and 84 has rotatively mounted thereto reference sleeves 86 and 88 similar to the feeler sleeve 50 and similarly mounted on substantially frictionless ball bearing sets such as the bearings 52 and 54 and are held in place by screws 90 and 92 and washers 94 and 96 respectively. Also, the reference sleeves 86 and 88 have conical ends 87 and 89 respectively similar to the conical end on feeler sleeve 50 to facilitate insertion into operating position on the web-type material 64 laterally from the edge 65 as shown in FIG. 1.

Vertically elongated adjustment slots 98 with shoulders or lands 100 against which the heads of screws 78 may be tightened and a vertically elongated clearance slot 102 are provided in the reference member support plate 80 to permit convenient and rapid adjustment of the elongated reference members 82 and 84 with their associated reference sleeves 86 and 88 in perpendicular relation to the elongated load feeler member 46 and feeler sleeve 50 to adapt for tension measurement in materials of different thickness as will be hereinafter further described.

The reference member support plate 80 also has an angular gaging extension 104 parallel to and overlapping the base plate 14. Thus by placing a strip of material 106 of known thickness between the angular gaging extension 104 and the base plate 14 while the screws 78 are loose to permit adjustment in perpendicular relation to the feeler member 46, the material 106 acts as a gage and permits rapid setting of the reference member support plate 80 for a particular thickness of material whose tension is to be measured, such as the web-type material 64. For this purpose the load deflection beam 28, the elongated load feeler member 46, reference members 82 and 84 and associated sleeves 50, 86 and 88 are preferably proportioned and arranged in relative positions such that the strip 106 may in fact be a piece taken from the web-type material 64 whose tension is to be measured. It will be noted that such gaging arrangement greatly facilitates accomodation or adjustment of the tension measuring apparatus 10 to various thicknesses of web-type materials for the measurement of tension therein. For small changes of thickness of the web-type material, the use of a piece thereof as the gage material 106 may be the only adjustment necessary, whereas for adjusting to a large thickness difference such as may occur in felt materials, the use of a piece of the material under test itself as the gage 106 provides at least a rapid and easy first approximation of adjustment needed with possible final adjustment thereafter being small.

In the operation of the tension measuring apparatus 10, the screws 78 are loosened to release the reference member support plate 80 and a piece of the web-type material 64 is inserted as 106 between the angular gaging extension 104 and the baseplate 14 so as to effect an adjustment space between the angular gaging extension 104 and base plate 14 equal to the thickness of the material 64. Thereupon the screws 78 are again tightened so as to secure the support plate 80 rigidly in place to the front end 16 of the housing 12. The tension measuring apparatus 10 is then inserted laterally from the edge 65 a substantial distance beyond the edge 65 into operating position on the web-type material 64 as shown in FIG. 1. It will be noted that the conical surfaces 62, 87 and 89 in engaging the edge 65 during the above insertion facilitates guidance of the load feeler sleeve 50 to the top surface of the material 64 and guidance of the reference sleeves 86 and 88 to the bottom surface of the material 64 which being under tension load indicated by arrows 108 and 110 will cause an upward force comparable to that indicated by arrow 76 in FIG. 2 which because of the geometry of the placement of the reference sleeves 86 and 88 equidistant from and on respective sides of the load feeler sleeve 50 has a conventionally computable relation to the tension in the material 64 and is measured by the strain gages 68 and indicated in conventional manner from read-out signals in the cable 70. It should be noted here that the location of the elongated reference members 82 and 84 on the support plate 80 is not limited to that shown in FIG. 1 in that the placement geometry may be varied to increase the range and improve the linearity of the apparatus for some tension measuring applications.

The FIGS. 1 and 2 embodiment show load feeler and reference sleeves 50, 86 and 88 as being of a size too large for some applications of limited space such as may occur in tape recorders and playback equipment. For such limited space applications, both feeler and reference sleeves with diameters as small as one eighth inch may be achieved by the alternative construction shown in FIG. 3 wherein sleeve 112 is carried on narrow lands 114 and 116 with recess 118 therebetween preferably carrying well known lubricant powders. Such construction is facilitated by incorporating the bearing shoulders 114 and 116 in a special screw 120 of bearing material and having a threaded shank 122 screwed into the end of an elongated member 124 comparable to the elongated members 46, 82 and 84. In such instance the sleeve 112 is confined between a shoulder 126 formed by the end of the elongated member 124 and a shoulder 128 on the head of the screw 120 to rotation on the bearing lands 114 and 116. With properly lapped bearing surfaces, it is found that with suitable powder lubricants, frictional forces may be held to a fraction of a gram which is negligible for even light load tension measurement applications.

Also a rounded or conical end surface 130 is provided to facilitate lateral insertion edgewise of the material whose tension is to be measured, as described in connection with FIG. 1.

While in FIG. 2 upper and lower stress concentration notches 66 carrying strain gages 68 have been found suitable for use in the present invention for sensing the magnitude of such loads as 76 at the feeler sleeve 50, other load measuring arrangements may also be used. For example, in place of the stress concentration notches 66, a stress concentration hole such as shown by the broken line 132 in FIG. 2 and described in detail in my U.S. Pat. No. 3,602,866 may also be used with strain gages carried therein. In such instance where the stress concentration hole 132 is hermetically sealed as described in my application U.S. Pat. No. 784,816 the housing walls 18, 20, 22 and 24 are not needed and tension measuring applications under water or other liquids may be made.

Also, in some instances it may be desirable to dispense with the offset member 42 shown in FIG. 2 and to screw the threaded shank 44 directly into the end of the load deflection beam 28 as shown in FIGS. 4, 5 and 6.

Further, other suitable load measuring arrangements applicable to the present invention in place of the stress concentration notches 66 and strain gages 68 are shown in FIGS. 4, 5, 6 and 7. In FIG. 4, capacitor elements 134 straddling the deflection beam 28 and coupled through lines 136 to conventional voltage and metering circuits 138 may effectively sense and correlate capacitor voltage changes with magnitude of beam deflection from load force 76 and thereby the magnitude of tension in the web-type material 64. In FIG. 5, an iron core 140 extending from the load deflection beam 28 into coils 142 and 144 forming a linear variable differential transformer coupled by lines 146 and 148 to conventional power and metering circuits 150 may effectively sense deflection magnitude of the beam 28 from load force 76 by correlation with voltage change in the differential transformer and thereby the magnitude of tension in the material 64. In FIG. 6, high frequency coils 152 about the load deflection beam 128 lie between and on a common axis with two high frequency coils 154 and 156 coupled by lines 158 and 160 to conventional electrical supply and metering circuits 162 to effectively sense deflection magnitude of the beam 28 from load force 76 by correlation with frequency change resulting in the circuit arrangement, and thereby magnitude of tension in the web-type material 64.

In FIG. 7, a conventional hydraulic or mechanical dial indicator 164 having a stem 166 rigidly fixed in a bracket 168 fastened by screws 170 to the cover or top plate 22 has a spindle 172 extending through an opening in the cover 22 and terminating in a contact point 174 engaging the top surface of the offset member 42 at the end of the deflection beam 28 to thereby cause indication by pointer 176 on calibrated dial 178 of magnitude of deflection by the deflection beam 28 from the load force 76. The dial indicator 164 thereby provides with the calibrations 180 on the dial face 178 a suitable indication of the magnitude of tension in the web-type material 64. It will be noted that the dial indicator 164 in the FIG. 7 embodiment may be used to measure beam deflection and thereby material tension whether or not the deflection beam 28 has stress concentration notches 66 or a stress concentration hole 132. Also the FIG. 7 dial indicator 164 embodiment may be used in many tension measuring applications as the only tension indicating arrangement or alternatively as a supplementary construction to provide a rapid visual check on readouts of the embodiments shown in FIGS. 1 through 6.

This invention is not limited to the particular details of construction and operation disclosed as equivalents will suggest themselves to those skilled in the art.

What I claim is:

1. In an apparatus for measuring tension in web-type and sheet-type materials a substantial distance from an edge thereof, the combination of a load deflection beam, means in responsive relation to deflection of said beam for sensing the magnitude of the load force causing said deflection, an elongated feeler member extending from said load deflection beam, a load feeler sleeve mounted for rotation on said feeler member a distance from said load deflection beam such that said feeler sleeve has capacity to engage said material a substantial distance beyond said material edge, a pair of elongated reference members straddling said feeler member, a reference sleeve mounted for rotation on each of said elongated reference members, and means rigidly fixing said elongated reference members in place with said reference sleeves in operative relation to said load feeler sleeve.

2. The combination as in claim 1 wherein said sleeves have reduced diameter ends for facilitating edgewise insertion of said sleeves into operating position on material whose tension is to be measured.

3. The combination as in claim 1 wherein said fixing means is comprised of a rigid support structure carrying said elongated reference members in substantially parallel relation to said feeler member, and means for adjusting said support structure with said reference members thereon in perpendicular relation to said elongated feeler member.

4. The combination as in claim 3 wherein said adjusting means includes gage means for setting the perpendicular distance between the feeler sleeve and the reference sleeves at preselectable values.

5. The combination as in claim 1 wherein said apparatus includes reference means for maintaining said substantial distance of said feeler sleeve a pre-set fixed distance beyond said material edge.

6. The combination as in claim 5 wherein said means rigidly fixing said elongated reference members in place includes a reference surface of said reference means for maintaining said pre-set fixed distance.

7. In an apparatus for measuring tension in web-type and sheet-type materials, the combination of a load deflection beam, means in responsive relation to deflection of said beam for sensing the magnitude of the load force causing said deflection, an elongated feeler member extending from said load deflection beam for transmitting said load force to said load deflection beam, a load feeler sleeve mounted for rotation on said feeler member a sustantial distance from said load deflection beam, a pair of elongated reference members straddling said feeler member, a reference sleeve mounted for rotation on each of said elongated reference members, a rigid support structure fixing said elongated reference members in place in substantially parallel relation to said feeler member with said reference sleeves in operative relation to said load feeler sleeve, and means for adjusting said support structure with said reference members thereon in perpendicular relation to said elongated feeler member, said adjusting means including gage means for setting the perpendicular distance between the feeler sleeve and the reference sleeves at preselectable values and adapted for including said material for providing a preselected value of said gage means setting.

8. In an apparatus for measuring tension in web-type and sheet-type materials, the combination of a load deflection beam, means in responsive relation to deflection of said beam for sensing the magnitude of the load force causing said deflection, an elongated feeler member extending from said load deflection beam for transmitting said load force to siad load deflection beam, a load feeler sleeve mounted for rotation on said feeler member a substantial distance from said load deflection beam, a pair of elongated reference members straddling said feeler member, a reference sleeve mounted for rotation on each of said elongated reference members, a rigid support structure fixing said elongated reference members in place in substantially parallel relation to said feeler member with said reference sleeves in operative relation to said load feeler sleeve, said rigid support structure including a base plate fixed to one end of said deflection beam and having an angular section at the other end of said deflection beam in perpendicular relation to said elongated feeler member, an adjustable support carrying said elongated reference members with said reference sleeves in operative relation to said elongated load feeler sleeve, and means cooperating with said adjustable support and angular section for fastening said support to said angular section at selectable positions of perpendicular adjustment of said reference members with respect to said elongated load feeler member.

9. The combination as in claim 8 wherein said adjustable support has a gaging projection overlapping said base plate for receiving a piece of said material between said overlapping projection and said base plate to establish one of said selectable adjustment positions.

10. The combination as in claim 9 wherein said load deflection beam includes a sealed stress concentration hole carrying strain gages operatively fixed therein to said load deflection beam for measuring tension load force transmitted to said load deflection beam.

11. The combination as in claim 9 wherein narrow lands of bearing material with a recess therebetween and a powder lubricant in said recess are provided for the rotational mounting of each of said sleeves.

12. The combination as in claim 9 wherein said means for sensing the magnitude of the load force causing said deflection includes stress concentration notches in said beam and strain gages in said stress concentration notches.

13. The combination as in claim 9 wherein said means for sensing the magnitude of the load force causing said deflection includes a capacitive sensing structure.

14. The combination as in claim 9 wherein said means for sensing the magnitude of the load force causing said deflection includes a linear variable differential transformer sensing structure.

15. The combination as in claim 9 wherein said means for sensing the magnitude of the load force causing said deflection includes a high frequency circuit sensing structure.

16. The combination as in claim 9 wherein said means for sensing the magnitude of the load force causing said deflection includes a dial indicator fixed in operative relation to said beam.

17. The combination as in claim 9 wherein said sleeves have reduced diameter ends for facilitating edgewise insertion of said sleeves into operating position on material whose tension is to be measured.

* * * * *